UNITED STATES PATENT OFFICE.

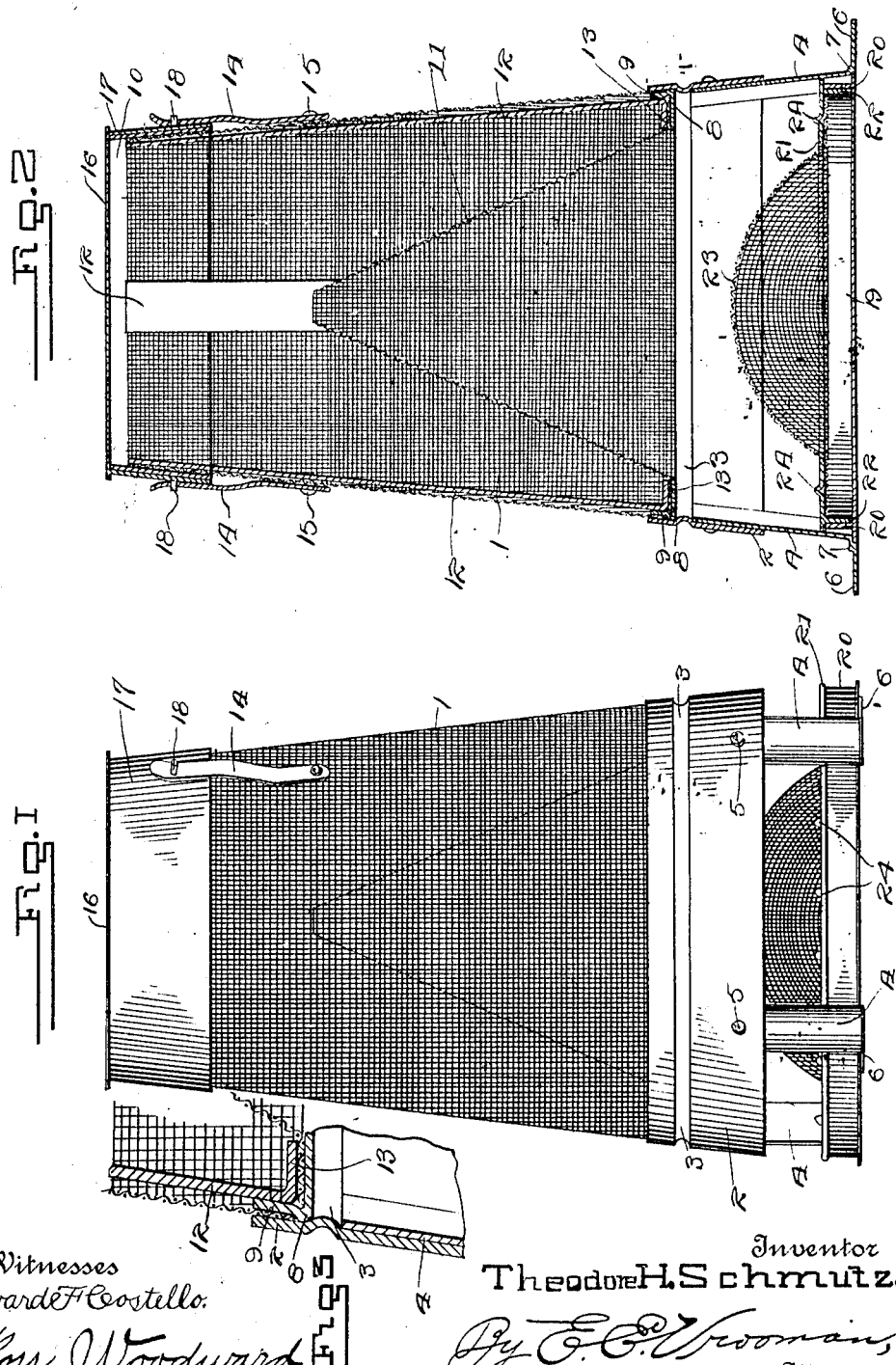

THEODORE H. SCHMUTZ, OF CHANUTE, KANSAS.

FLY-TRAP.

1,012,452.   Specification of Letters Patent.   Patented Dec. 19, 1911.

Application filed April 20, 1911. Serial No. 622,335.

*To all whom it may concern:*

Be it known that I, THEODORE H. SCHMUTZ, a citizen of the United States, residing at Chanute, county of Neosho, and State of Kansas, have invented certain new and useful Improvements in Fly-Traps, of which the following is a specification, reference being had therein to the accompanying drawing.

This invention relates to traps for catching winged insects, such for instance, as flies, and the principal object of the same is to provide a trap in which the bait is placed so that the flies will be attracted by the same, but cannot consume it and which is placed so that after being attracted the flies will enter the trap and be prevented from escaping.

A second object of the invention is to provide an improved means for securing the several parts of the invention together.

This invention is illustrated in the accompanying drawings, wherein:—

Figure 1 is a view in elevation of the improved trap. Fig. 2 is a vertical section through the trap. Fig. 3 is an enlarged fragmentary view of the lower portion of the trap.

This invention comprises a receptacle 1 which has a metallic band 2 at its bottom portion which is tapered and is provided with an inturned bead 3 near its upper edge. Supporting legs 4 are positioned within the band 2 and are secured by means of the rivets 5 with their upper edges resting against the bead 3 so that the legs will be braced by the bead 3. The lower portions of the legs are bent to form the feet 6 and seats 7 are formed at the junction of the legs and feet. A metallic ring 8 having a flange 9 is placed in the upper portion of the band 2 and rests upon the bead 3. This band securely clamps the lower portion of the fabric walls of the trap in the band. The band is soldered to the bead 3 and to the fabric wall and upper portion of the band 2 so that there is no possibility of the band or fabric coming loose. The upper portion of the fabric wall is inclosed by a collar 10 and secured thereto by means of solder which is dropped upon the fabric. A conical lead 11 which is formed from fabric and has an opening at its apex is placed in the trap and rests upon the ring 8 where it is secured by means of solder. Reinforcing strips 12 are placed within the trap and have their lower ends 13 bent at right angles and resting upon the lower portion of the lead 11 where they are secured by means of solder and assist in holding the lead in place. These strips extend up the sides of the trap and have their upper ends secured within the collar 10 by means of solder. These strips brace the trap and also assist in retaining the collar 10 in place. Spring catches 14 are secured to the strips 12 by means of rivets 15 and hold the cover in place.

The cover comprises a top portion 16 and an annular depending flange 17 which fits upon the collar 10 and is provided with lugs 18 which engage the catch 14.

The bait pan comprises a receptacle 19 having a side rim 20. The cover 21 is provided with a flange 22 which fits within the flange 20 and with a fabric central portion 23. The cover is provided with a number of outwardly extending perforated points 24 into which the solder which secures the fabric central portion 23 flows and is thus more securely held upon the cover. This bait pan is placed between the legs 4 and has the receptacle 19 fitting into the seats 7 so that the bait pan is held in place. The band 2 extends down the legs 4 a sufficient degree so that when flies are resting upon the fabric central portion of the bait pan they will fly up into the lead when leaving the pan instead of flying out of the trap.

In the operation of this device, sugar, syrup or any other sweet substance is placed in the bait pan and the pan placed beneath the trap. Flies are attracted by the bait and enter the trap beneath the band 2 and rest upon the fabric portion 23. The flies can smell and see the bait but cannot consume the same. When the flies leave the bait pan they fly up into the lead 11 through the opening in its apex and into the trap. When it is desired to empty the trap the flies may be killed by any desired means. The cover can then be removed and the dead flies emptied out.

What I claim as my invention is:—

1. A trap of the character described comprising a fabric wall, a metallic band at the base of said fabric wall, said band being provided with an inwardly extending bead, a plate resting upon said bead and provided with an upwardly extending flange clamping said wall within said band, a conical leader having a flange at its lower end resting upon said plate, vertical strips positioned within said wall and having their lower ends bent inwardly and resting upon the lower portion of said guide to clamp the same upon said plate, and a cover mounted upon the upper portion of said wall.

2. In a trap, a body portion, legs secured to the lower portion of said body portion, the lower portions of said legs being bent to form feet and being also bent to form seats at the junction of said legs and feet, a bait pan, said bait pan comprising a receptacle fitting between said legs and into said seats, a cover for said bait pan, and a fabric central portion for said bait pan.

In testimony whereof I hereunto affix my signature in presence of two witnesses.

THEODORE H. SCHMUTZ.

Witnesses:
F. E. BODBY,
E. P. BURRIS.